(12) United States Patent
Claessens et al.

(10) Patent No.: US 7,827,407 B2
(45) Date of Patent: Nov. 2, 2010

(54) SCOPED FEDERATIONS

(75) Inventors: Joris Claessens, Aachen (DE); Christian Geuer-Pollman, Aachen (DE); Laurent Bussard, Aachen (DE)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 11/427,535

(22) Filed: Jun. 29, 2006

(65) Prior Publication Data
US 2008/0002696 A1 Jan. 3, 2008

(51) Int. Cl.
*G06F 21/00* (2006.01)
(52) U.S. Cl. .................. 713/170; 370/392; 709/213
(58) Field of Classification Search ............... 709/213; 370/392; 713/170
See application file for complete search history.

(56) References Cited

U.S. PATENT DOCUMENTS

| 2003/0002521 A1* | 1/2003 | Traversat et al. ............ 370/465 |
| 2003/0088434 A1 | 5/2003 | Blechman |
| 2003/0163513 A1 | 8/2003 | Schaeck et al. |
| 2005/0114701 A1 | 5/2005 | Atkins et al. |
| 2005/0188212 A1 | 8/2005 | Laferriere et al. |
| 2005/0223412 A1 | 10/2005 | Nadalin et al. |
| 2006/0020508 A1 | 1/2006 | Gorti et al. |
| 2006/0021010 A1 | 1/2006 | Atkins et al. |
| 2006/0074876 A1 | 4/2006 | Kakivaya et al. |

OTHER PUBLICATIONS

Taylor, et al., "Implementing Role Based Access Control for Federated Information Systems on the Web", <<http://crpit.com/confpapers/CRPITV21ATaylor.pdf>>, 9 pages, 2003.
Van Dyke, "Establishing Federated Trust Networks Among Web Services", Mar. 23, 2004, <<http://www.cs.virginia.edu/~acw/security/Establishing%20Federated%20Trust%20Among%20Web%20Services.pdf>>, 57 pages.

* cited by examiner

*Primary Examiner*—Nasser Moazzami
*Assistant Examiner*—Lisa Lewis
(74) *Attorney, Agent, or Firm*—Lee & Hayes, PLLC

(57) ABSTRACT

A scoped federation is described which is referenced by a unique identifier and messages relating to the federation include this unique identifier. The federation is scoped by rules which are stored associated with the unique identifier and upon receipt of a request containing the unique identifier, the related rules are checked to determine if the request is valid.

19 Claims, 12 Drawing Sheets

SCOPED FEDERATIONS

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Increasing amounts of data and services are being shared between organizations, either as part of formal collaborations between organizations (e.g. collaborative research and development programs, sub-contract arrangements etc) or as a result of less formal interactions (e.g. sales presentations, one time interactions, provision of technical support etc).

Several mechanisms exist for sharing data/services as part of formal collaborations between organizations including vendor accounts, extranets, and cross-certification of their public key infrastructures (PKI). Such mechanisms are managed centrally within an organization, for example by the organization's IT department. Similarly, several mechanisms exist for sharing data/services in more dynamic collaborations such as email, peer to peer sharing solutions and third party collaboration services. These mechanisms are generally controlled by individual employees within an organization.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A scoped federation is described which is referenced by a unique identifier and messages relating to the federation include this unique identifier. The federation is scoped by rules which are stored associated with the unique identifier and upon receipt of a request containing the unique identifier, the related rules are checked to determine if the request is valid.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, the existing mechanisms for sharing data/services as part of formal collaborations between organizations are managed centrally within an organization, for example by the organization's IT department. Whilst these mechanisms may be secure, the centralized management results in a relatively inflexible collaboration and due to the management overhead, such mechanisms are not suitable for more dynamic interactions, which may be one time interactions. Furthermore, the cross-certification techniques (e.g. using PKI) apply broadly between the organizations and do not limit what information/services may be shared.

In contrast, the existing mechanisms for sharing data/services in dynamic collaborations enable data/services to be shared in a very flexible manner but are often insecure. Additionally as the mechanisms are controlled by the employees without control or visibility by a centralized management entity (such as an IT department) it is difficult for an organization to manage or control the flow of information out of an organization.

Figure 1:
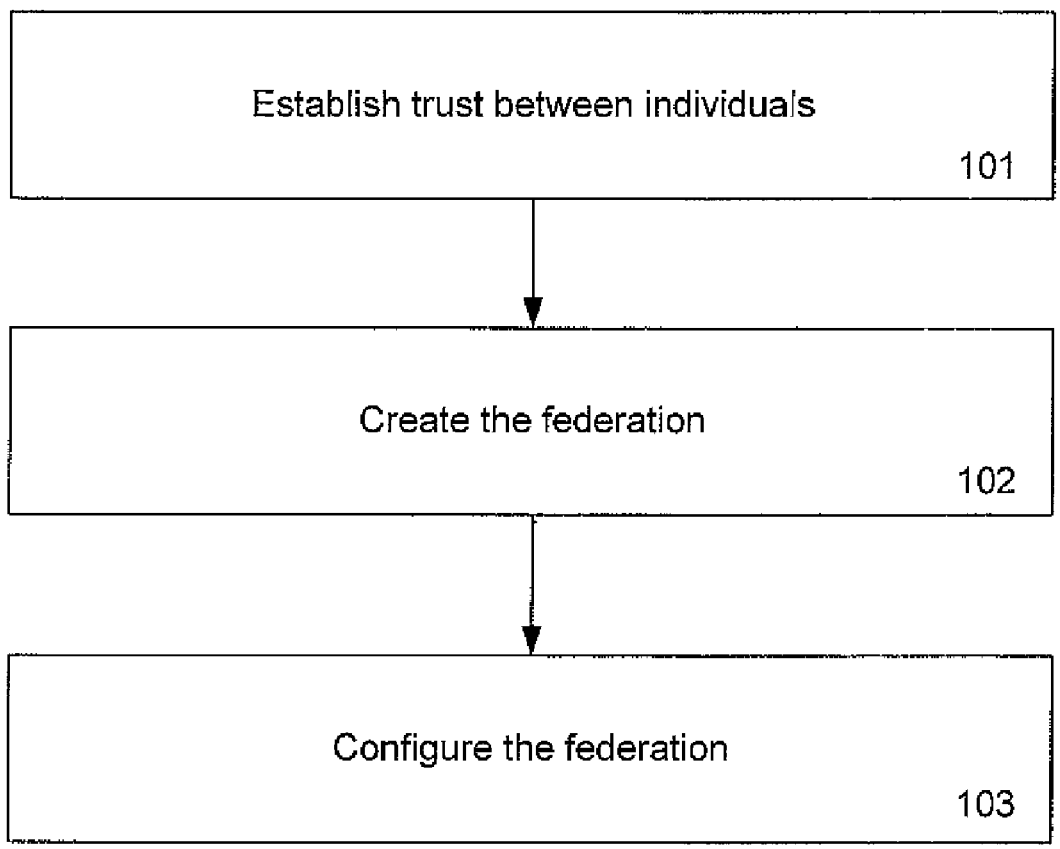
FIG. 1 is an example flow diagram of a method of establishing a scoped federation between two or more organizations.

FIG. 1 is an example flow diagram of a method of establishing a scoped federation between two or more organizations. Two (or more) individuals who want to collaborate establish trust in each other (step 101). This trust may, for example, be established at a face to face meeting between the individuals. Having established trust, the federation is created (step 102) and then configured (step 103). Each of these steps is described in more detail below and the use of such a federation, once established, to share services and other data is also described below.

The term 'federation' is used herein to refer to a group of multiple domains that have established trust with each other. The term 'scoped federation' is used herein to refer to a federation where the established trust as well as the interaction between domains is limited by one or more sets of rules.

Although the description below relates to the establishment of scoped federations between two organizations (referred to as 'Company A' and 'Company B') by two individuals (referred to as 'Erik' and 'Carol') and the subsequent use of such a scoped federation, it will be appreciated that this is by way of example only. A scoped federation and the methods described herein may involve any number of organizations. Furthermore, there may be many federations between the same group of organizations (e.g. with different scope) or between different groups of organizations.

An application of such a scoped federation may by analogy to an example conversation between Fred and Joanne from Company A and Company B respectively. Company A and Company B may have an agreement to work closer together on projects in the future, (such a general agreement is similar to an unbound federation). Many collaborative actions are now possible, but the practical meaning may be unclear for the employees. If Joanne receives a phone call from an employee from Company B who says: "Hey, I'm Fred from Company A, and I want that you send me the design document you're currently working on", it is not possible for Joanne to decide based on the information available whether Fred's request is authorized or not. She may be able to determine that Fred is really working for Company A (e.g. using the caller ID of her phone or Fred's e-mail address), but it is unclear whether Fred is really working on the same things that Joanne works on and whether he is permitted to receive the information he has asked for. However, if Fred provides Joanne with additional context such as evidence that he is working on the same project and some authorization details which she can check, Joanne can make an informed decision whether the request is valid or not.

Figure 2:
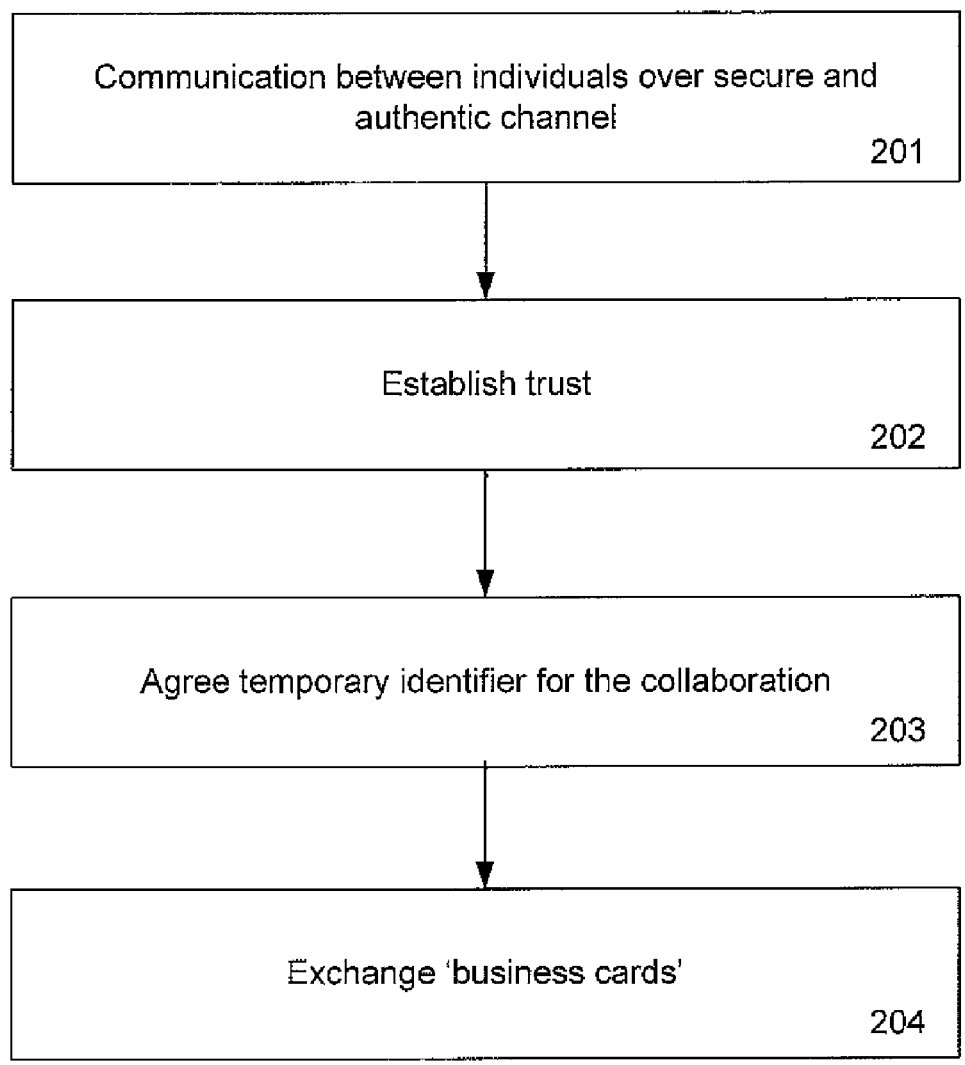
FIG. 2 is an example flow diagram of a method of establishing trust.

FIG. 2 is an example flow diagram of a method of establishing trust (step 101) in more detail. An individual from a first organization (e.g. Erik from Company A) communicates with an individual from a second organization (e.g. Carol from Company B) over a secure and authentic channel, such as a face to face meeting, a video conference etc (step 201). They establish trust in each other (step 202, e.g. through conversation) and agree a temporary identifier for the collaboration (step 203). The temporary identifier may be an easy to remember keyword or phrase, such as the name of the project (e.g. ProjectX), the names of the two contacts (e.g. Erik and Carol) etc. Whilst it is not necessary for this keyword or phrase to be universally unique (i.e. no other collaboration with this temporary identifier), it may be unique to the particular group of organizations (e.g. no other collaboration between Company A and Company B with this temporary identifier) or unique to the contacts (e.g. no other collaboration between Erik and Carol with this temporary identifier. Use of an easy to remember identifier (or seed) enables all parties to independently generate the unique federation ID (as described below) and therefore means that there is no need to agree between parties who is going to provide the ID.

Information is then exchanged between the two individuals, referred to herein as 'business cards' or 'corporate business cards' (step 204). A 'corporate business card' comprises at least an endpoint reference to an entity (such as a web service) within the corporation that will issue security tokens in the context of this federation (such as a Security Token Service, STS) and a security token associated with the entity (e.g. the certificate of the corporate STS or any other kind of security token). An example of an STS is Microsoft's Active Directory Federation Services (ADFS) in Windows Server (trade mark). The corporate business card may comprise XML data and may be digitally signed, to enable the recipient to confirm that the data has not been tampered with. The exchange of business cards may be performed by any suitable means, including, but not limited to, electronic transfer of the data between devices (e.g. laptops, PDAs, mobile telephones etc) associated with each of the individuals. This transfer may, for example, be by Bluetooth, infra-red or other wireless link and may be a direct transfer of information between devices or use other techniques (e.g. as an attachment to an email). The information may, in another example, be transferred using a portable storage medium (such as a USB memory device, a compact disc etc) or by any other means. Corporate business cards may also be provided through other means, such as downloads from the company's web server or from a UDDI repository.

Figure 3:
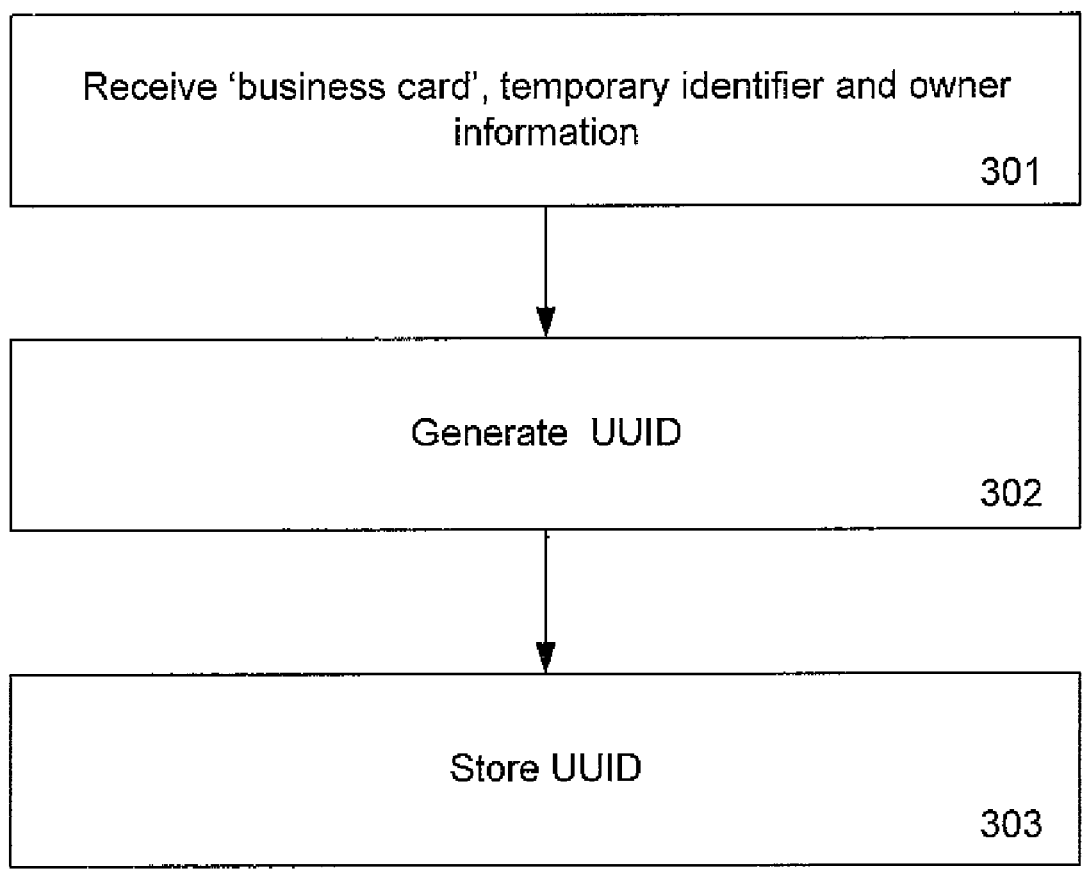
FIG. 3 is an example flow diagram of a method of creating a federation.
Figure 4:
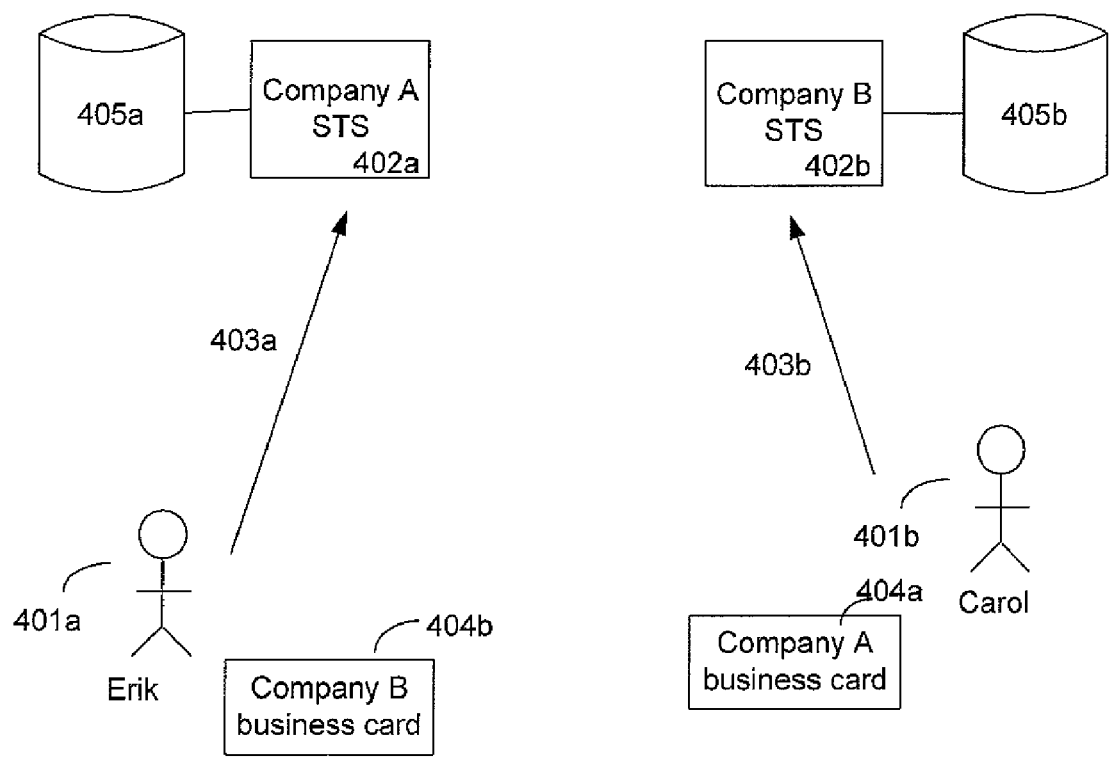
FIG. 4 is a schematic diagram which shows the flow of information in the method of FIG. 3.

FIG. 3 is an example flow diagram of a method of creating a federation (step 102) in more detail, which can be explained with reference to the schematic diagram of FIG. 4 which shows the flow of information between entities and individuals in each organization. Within each organization, the individual 401a, 401b passes the data relating to the federation to be established to the organization's STS 402a, 402b (arrows 403a, 403b). This data relating to the federation comprises the corporate business card of the other organization(s) 404a, 404b and any agreed temporary identifier (e.g. 'ProjectX'). The data may also comprise additional information such as the 'owner' of the federation within the organization (e.g. Erik for Company A and Carol for Company B) and the main contact at the other organization. In order to be able to pass the data to the STS, the individual may need to authenticate within their organization (e.g. through username and password). This authentication process enables the STS to identify the creator of the federation and in some examples, the federation creator may be assigned as the owner of the federation unless other data is provided (for example as described above). The data is received by the corporate STS 402a, 402b (step 301) and may be stored in a federation database 405a, 405b associated with the corporate STS 402a, 402b (step not shown in FIG. 3). Using this received information, each STS independently generates the same unique universal ID (UUID) for the federation (step 302) and stores this in its associated federation database (step 303). The UUID may comprise a long alpha-numeric sequence, such as:

ebafedcf-5d73-b4c8-b419-a7e898708fa0.

The association of an owner with each federation established by an organization may assist in the management and control of the federation by providing a point of contact for queries relating to the federation or for queries/messages from the organization's central management entity, such as the IT department. In some examples, the setting up and management of the rules relating to a federation (see below) may be limited to the owner or to the owner and the organization's central management entity (e.g. the IT department).

The UUID may be generated (in step 302) using a pre-defined algorithm, such as a hash function. Hash functions map a large block of information, b, to an output h(b) typically of much smaller size. The hash function has the property that given a block b, it is computationally infeasible to find another block, b', with the same hash value, i.e. where h(b)=h(b'). Suitable hash functions for use in generation of a UUID include SHA-1 (Secure Hash Algorithm-1), SHA-2, MD4 (Message Digest 4) and MD5. These hash functions are particularly effective in producing unique hashes where the original blocks of information are similar. If all the STSs in the federation use the same information (e.g. some or all of information received and some additional data relating to the particular STS in a pre-agreed sequence) and the same hash function (e.g. MD5), they will generate the same value for the UUID. In an example, each STS 402a, 402b may create a block of data comprising the temporary identifier, the owner at Company A, the owner at Company B, the endpoint reference of company A's STS and the endpoint reference of Company B's STS. Each STS may then create a UUID by taking a hash of this data using SHA-1 and this results in both STSs having the same UUID for the federation.

In another example, the UUID may be generated (in step 302) using a third party service such as a naming authority.

In some examples, the individuals (e.g. Erik and Carol) may not have the required authorization within their organization to create the new federation. This may be because the organization (e.g. through the IT department) has set up a framework on the STS detailing who can create, manage, and/or delete federations and/or which third party organizations federations can be created with (e.g. there may be a list of blocked organizations such as key competitors). In such a situation, an individual may need to pass the data to another individual or entity (e.g. to the organization's IT department) and that individual or entity may subsequently pass the data to the STS if the creation of the new federation is permitted (e.g. there may be some additional validation and/or approval steps required before a new federation can be created in the STS).

Figure 5:
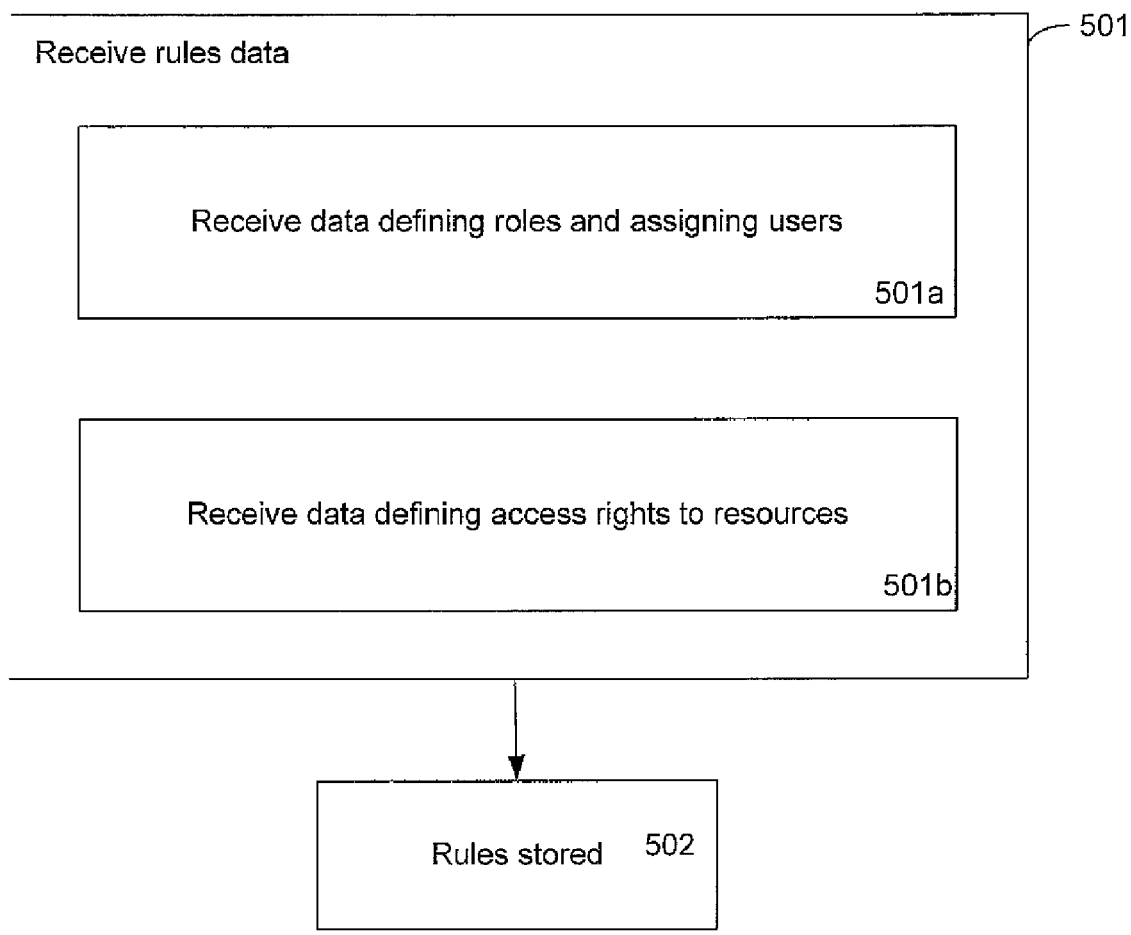
FIG. 5 is an example flow diagram of a method of configuring a federation.

FIG. 5 is an example flow diagram of a method of configuring the federation (step 103) in more detail, which can be explained with reference to the schematic diagram of FIG. 6 which shows the flow of information between entities and individuals in each organization.

Within each organization, the owner (or another individual) defines a set of rules for the federation and these are input to the organization's STS (arrow 601a, 601b, received by the STS in step 501), for example, these may be input via a custom web service. The rules defined within an organization relate to the individuals and resources within that organization and therefore the rules defined within each organization may be different. However, in another example, the federation may use a shared set of rules containing information on individuals and resources within more than one organization. The rules defined may be subject to other rules within the organization (e.g. an overall set of rules defined by an organization's central management entity, such as an IT department). The individuals may include employees, interns, contractors and any other individuals associated with the organization. The resources may include services (e.g. web services), data, and applications etc which are associated with the organization. These resources are deployed in such a way that they are available outside the organization with which they are associated, i.e. they can receive messages originating from other organizations. This may be achieved by opening the organization's firewall appropriately or by putting the resource outside the organization's firewall.

In an example, Erik defines rules relating to employees 603a of Company A and resources 604a owned by Company A whilst Carol defines rules relating to employees 603b of Company B and resources 604b owned by Company B. These rules are then stored (step 502) associated with the UUID. The rules may be stored anywhere where they are accessible by the STS. For example, they may be stored in the federation database 405a, 405b, in a specific database for that federation 602a, 602b, (which may be part of the federation database or connected to it), in a rules engine or elsewhere. As the rules are stored associated with the UUID, they are linked to the particular federation. This means that rules set up for one federation by default have no effect on any other federations or the rules for those federations.

The rules data itself may not be shared between organizations, however claims relating to those rules are exchanged in the requests for access to resources, as described in more detail below.

The rules data (received in step 501) may comprise data defining specific roles for the federation and assigning individuals to those roles (received in step 501a). These roles may relate to an individual type (e.g. full time employee, intern etc), actions permitted by an individual with the role (e.g. editor, reviewer etc) or any other criteria. The rules data may also comprise data associating resources associated with the organization with the federation and defining access rights to those resources (received in step 501b). In an example, the rules data may comprise data mapping roles and individuals and data mapping resources, roles and access rights:

| Individual | Roles | |
|---|---|---|
| Erik | Owner | |
| Sue | Reviewer + Editor | |
| John | Reviewer | |
| Resource | Access type | Required Role claims |
| Resource1 | Read | Owner or Editor or Reviewer |
| Resource1 | Edit | Owner or Editor |

It will be appreciated that the example rules data shown above is provided by way of example only and the rules may be more complex than just providing a mapping to role attributes (e.g. they may include information for determining whether a requestor is part of a federation, whether a federation is still active etc).

Although the organizations within a federation define their own rules, the organizations within a federation have a common understanding, such as vocabulary and semantics, of the cross-organizational claims that will be used (see below) and the rules in all organizations within the federation may refer to these common claims. Where the rules refer to internal roles, the organization may need to map these internal roles to the cross-organizational claims (e.g. as part of the rules or separately).

It will be appreciated that whilst the above example uses a role based access control model, other authorization policies may alternatively be adopted. For example, location claims may be used e.g. access is granted if the requestor is within a certain physical range of the resource.

The use of scoped federations and strict rules governing this scope, as opposed to broad trust relationships at organizational level, reduces the threat to a company because only limited assets are exposed and makes information leakage easier to detect and control.

Figure 6:
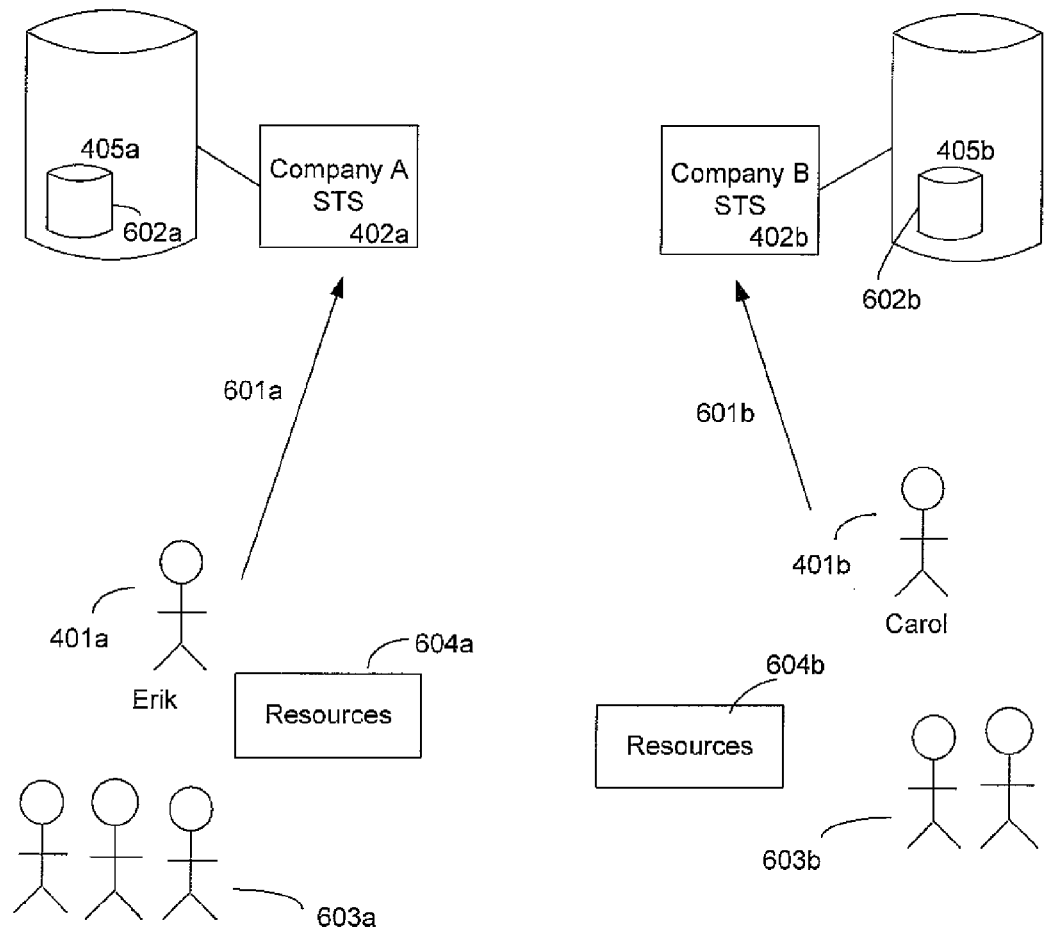
FIG. 6 is a schematic diagram which shows the flow of information in the method of FIG. 5.

Although the above description and FIG. 6 show both organizations having both individuals and resources, there may be examples where an organization in a federation has only individuals or resources which are associated with the federation and therefore referenced in the rules data (e.g. an organization may be solely providing resources to other organizations, or an organization may be accessing resources offered by another organization).

Figure 7:
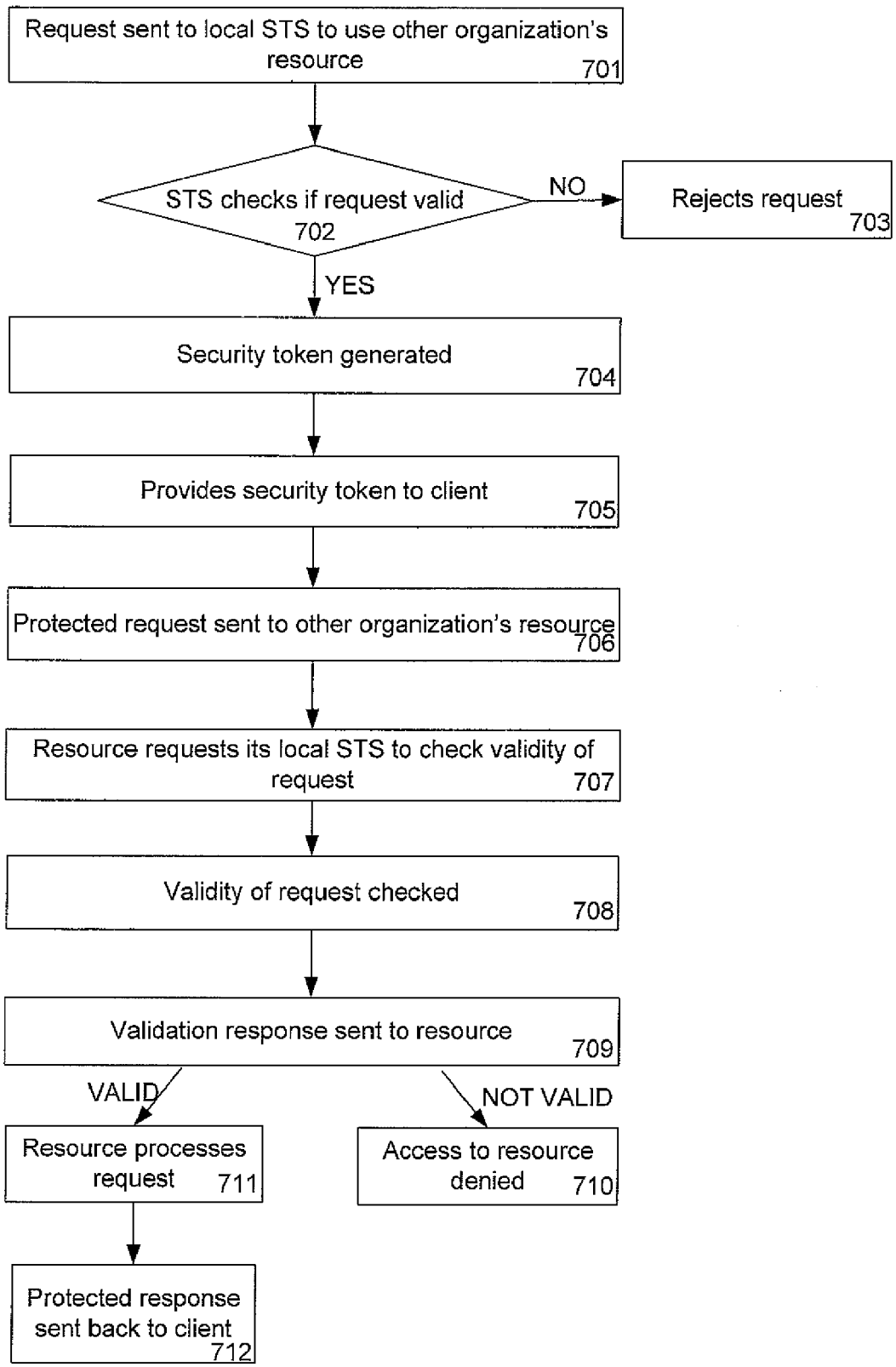
FIG. 7 is a first example flow diagram of a method of using a scoped federation.

FIG. 7 is a first example flow diagram of a method of using a scoped federation which may be established as described above. This method can be explained with reference to the schematic diagram of FIG. 8 which shows the flow of information between entities and individuals in each organization. For purposes of explanation only, FIG. 8 shows a single resource 604b associated with Company B and a single individual 603a (e.g. John) associated with Company A.

An individual 603a, John, at Company A wants to access a resource (such as a service) at Company B as part of a particular scoped federation. Using a client 801 (such as an application running on a PC), John sends a request to his local organization's STS (i.e. Company A's STS 402a in the example of FIG. 8) to use the resource belonging to Company B (step 701). The request message includes the UUID of the particular federation (e.g. UUID ebafedcf-5d73-b4c8-b419-a7e898708fa0). In response to receiving the request, the STS checks the validity of the request (step 702), for example by determining if the requester (John) is part of the federation and the attributes that the requestor has in the context of the particular federation. The validity check may therefore involve checking that John is still associated with Company A (e.g. as an employee, contractor, intern etc), checking that the federation is still active, checking that John is part of the federation and confirming John's role within the federation. This checking process involves the STS accessing the rules stored associated with the particular UUID which may be stored in a specific database 602a or elsewhere (as described above).

Figure 8:
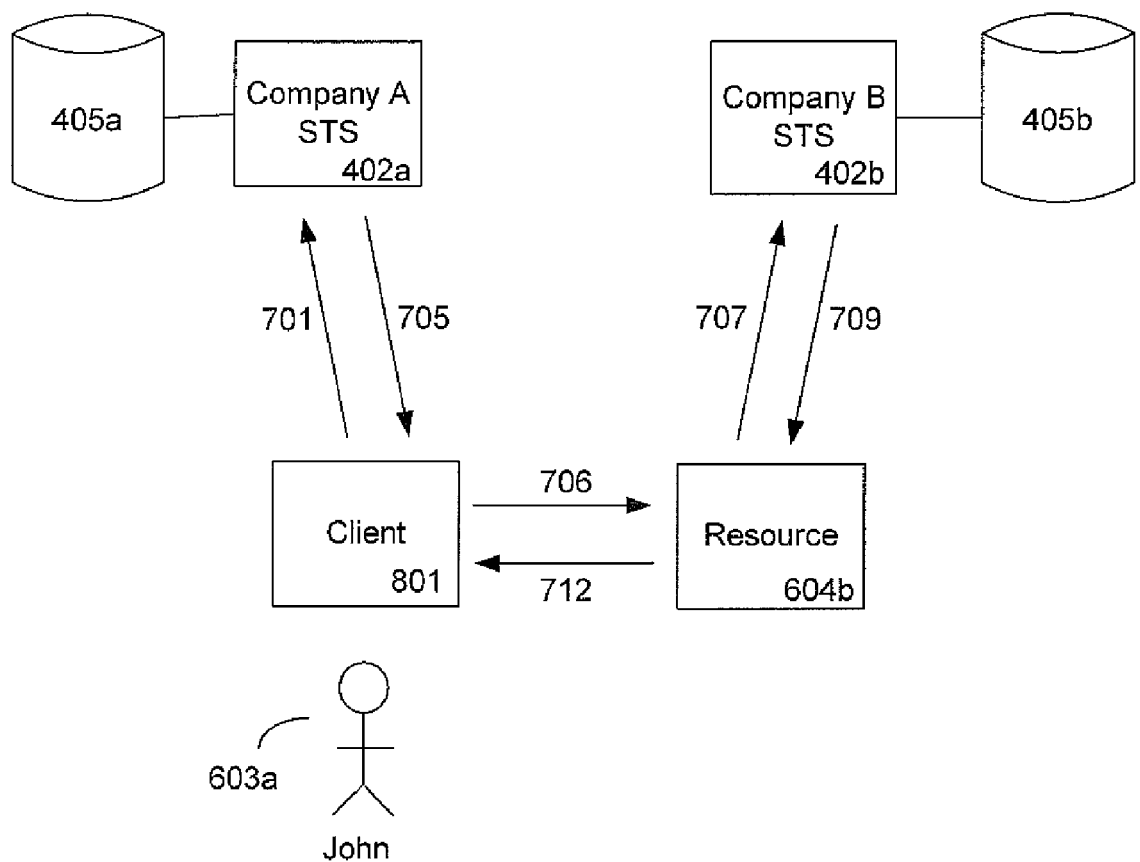
FIG. 8 is a schematic diagram which shows the flow of information in the method of FIG. 7.

If (in step 702) the request is found to be invalid, the STS rejects the request (step 703, not shown in FIG. 8). However, if the request is valid, the STS generates a security token (step 704) and provides this to the client (step 705). The security token represents the attributes associated with the requester, John, (e.g. in the form of role claims) and the federation context (i.e. the UUID). The security token, in the example shown in FIG. 8, therefore indicates that John has the role of an editor in the particular federation with a UUID of ebafedcf-5d73-b4c8-b419-a7e898708fa0. The information regarding the role is provided as a role claim. This security token is then sent as part of an authenticated and confidentiality protected request (from John via client 801) to the resource 604b in Company B to use that resource (step 706). Upon receipt of the request, the resource 604b asks its local STS (i.e. Company B's STS 402b in the example of FIG. 8) to validate the security token received from Company A and to grant or deny access to that resource based on the token (step 707).

The resource side (e.g. Company B) STS checks the validity of the token (step 708) and provides a validation response to the resource (step 709) e.g. granting or denying access. The validity check involves determining whether the token was issued by an organization that is part of the particular federation and processing the presented claims (e.g. by looking up the required attributes to access the resource). In this example, the token indicates that the request has come from an individual of Company A with the role of an editor in the particular federation with a UUID of ebafedcf-5d73-b4c8-b419-a7e898708fa0. The STS 402b accesses the rules associated with the UUID (which may be stored in a specific database 602b or elsewhere (as described above)) and determines from the access rights whether an editor of Company A in this specific federation can access the particular resource. Having completed the check, the STS sends a validation response to the resource (step 709) containing the access control decision.

If the validation response (sent in step 709) indicates that the request is not valid (i.e. access is not granted), the resource sends a message to the requestor (e.g. client 801) denying access to the resource (step 710, not shown in FIG. 8). However, if the validation response indicates that the response is valid (i.e. access is granted), the resource processes the request (step 711) and sends back an authenticated and confidentiality protected response to John (via the client 801, step 712), for example using SOAP Message Security and the security token. In this manner, access to resources within a federation is limited to those individuals who are part of the federation (and subject to their access rights) and to those services which are attached to the federation (e.g. by the rules as detailed above).

In the above method, all the messages passing between entities contain the UUID which references the particular federation under which requests are being made/granted/denied (e.g. steps 701, 703, 705-707, 709, 710 and 712). These communications are therefore constrained to entities which belong to the federation.

The security token, generated in step 704 by the requester side STS (e.g. Company A's STS 402a) may be encrypted using the security token associated with the resource side STS (e.g. Company B's STS 402b) which was provided as part of the business card (in step 204, as described above). The resource side STS therefore decrypts the token upon receipt (in step 708).

The security token, generated in step 704, may also include a symmetric key which may be used for encryption of communications between the two companies (e.g. in steps 706 and 712). The symmetric key is provided to the requestor (client 801) in unencrypted form along with a security token, which contains the encrypted key, in step 705. The key may be used by the client to authenticate and encrypt information within the request sent to the resource (in step 706). The encrypted key is extracted from the security token by the resource side STS. The resource side STS decrypts the key and provides it to the resource in unencrypted form as part of the validation response (in step 709). This enables the resource to decrypt and verify authenticity of the protected part of the request (as part of step 711) and to authenticate and encrypt the response to the client (in step 712).

In another example, each resource may have its own token (e.g. certificate) with which messages to the service can be encrypted (e.g. instead of using the symmetric key). This is described in more detail below in [0059].

If, subsequently, John wants to access the same resource under the same federation, he may be able to reuse the security token issued previously in step 705 and therefore avoid the need to repeat method steps 701-705. However, the security token may include time constraints on its validity (see SAML conditions "NotBefore" and "NotOnOrAfter" in the example tokens shown below). The time period for which a security token is valid is determined by the issuing entity (e.g. the STS). Whilst a short time period provides greater flexibility in the management of the federation (i.e. any changes in rules will take effect sooner, as described below), a longer time period simplifies the interactions where a requestor needs to make multiple requests under a federation.

The methods described above may be implemented based on the web services security and federation framework (WS-Trust and WS-Federation). In such an implementation, specific WS-Trust and SAML (Security Assertion Markup Language) token profiles may be used, as described below. It will be appreciated that the implementation described below is just one possible implementation and provides only examples of custom formats for identifiers and other parameters. The methods may be implemented in alternative technologies (e.g. using SAML specification suite protocols) or in the same technology but in a different manner.

In this example implementation, the namespace prefixes are defined as:

--- xmlns:soap="http://schemas.xmlsoap.org/soap/envelope/"
xmlns:wst="http://schemas.xmlsoap.org/ws/2005/02/trust"
xmlns:wsp="http://schemas.xmlsoap.org/ws/2004/09/policy"
xmlns:wsa="http://schemas.xmlsoap.org/ws/2004/08/addressing"
xmlns:wsse="http://docs.oasis-open.org/wss/2004/01/oasis-200401-wss-wssecurity-secext-1.0.xsd"

-continued

```
xmlns:wsu="http://docs.oasis-open.org/wss/2004/01/oasis-200401-wss-
wssecurity-utility-1.0.xsd"
xmlns:saml="urn:oasis:names:tc:SAML:1.0:assertion"
xmlns:xenc="http://www.w3.org/2001/04/xmlenc#"
xmlns:ds="http://www.w3.org/2000/09/xmldsig#"
```

Definitions are not provided for the custom prefixes xmlns: collab, xmlns:frc, xmlns:fpi and xmlns:wstx used in this example implementation because these custom prefixes are provided by way of example only. The use of 'collab', 'frc', 'fpi' and 'wstx' is by way of example only.

In requesting a security token (steps 701, 705), the "Issuance Binding" profile as defined by the WS-Trust specification from February 2005, is used in which:

wst:TokenType

The WS-Trust token type for cross-organizational SAML assertions is defined as follows:
<Wst:TokenType>http://docs.oasis-open.org/wss/oasis-wss-saml-token-profile-1.1#SAMLV1.1</wst:TokenType> wsp:AppliesTo

In this profile, the requestor of a security token MUST specify a wsp:AppliesTo element as part of the wst:RequestSecurityToken. This element may have the following components:

wsp:AppliesTo/wsa:EndpointReference/wsa:Address (MAY)

The URI of the web service where the token will be used.

wsp:AppliesTo/wsa:EndpointReference/wsa:Action (MAY)

The action that is invoked on the web service where the token will be used.

wsp:AppliesTo/wsa:EndpointReference/wsa:ReferenceProperties/c ollab:FederationUUID (MUST)

The FederationUUID is an identifier of the federation scope inside which the token will be used. We expect that an issue request for a cross-organizational token MUST contain a FederationUUID. That is necessary because the STS must be able to lookup whether the requesting client has available claims in this specific federation scope.

The description above uses a custom format for the FederationUUID, however, the model allows use of other types of identifiers with equivalent functionality.

wsp:AppliesTo/wsa:EndpointReference/wsa:ReferenceProperties/f pi:FederationPartnerIdentifier (SHOULD)

The federation partner identifier is an identifier of the partner organization to which the service request will be sent. Such a partner identifier may be a long-term credential of the partner's STS (such as an X.509 certificate or a reference to a certificate), or some other unique identifier.

The STS needs the federation partner identifier for different purposes: In a symmetric-key based (Kerberos-like) model, the STS requires this information to determine the service's organization's security token (e.g. certificate), so that the STS can include a session key inside the cross-organizational token. In addition, the partner identifier may be used for client-side security decisions.

The description above uses a custom format for the FederationPartnerIdentifier, however, the model allows use of other types of identifiers with equivalent functionality.

wst:RequestedSecurityToken

The wst:RequestedSecurityToken MUST contain a cross-organizational saml:Assertion element.

wst:RequestedProofToken

The wst:RequestedProofToken SHOULD contain the private or secret key material associated with the saml:Assertion. In the current "scoped federations" prototype, the wst:RequestedProofroken contains an xenc:EncryptedKey element. The xenc:EncryptedKey contains a symmetric key encrypted for the requestor of the token, i.e., the key is encrypted under the client's organization-internal key.

The SAML Assertion Profile for a SAML cross-organizational token, as used in the Issuance Binding profile above, is based on the SAML 1.1 Assertion specification (http://www.oasis-open.org/committees/download.php/3406/oasis-sstc-saml-core-1.1.pdf) and the Web Services Security SAML Token Profile 1.1 (http://www.oasis-open.org/committees/download.php/ 15256/ Web%20Services%20Security%20SAML%20Token%20 Profile-11.pdf).

The cross-organizational security token is a SAML 1.1 saml:Assertion. The saml:Assertion MUST include saml:Conditions, saml:AttributeStatement, and ds:Signature elements:

saml:Assertion

The @Issuer attribute SHOULD contain the URI of the issuing STS.

saml:Conditions

In addition to the @NotBefore and @NotOnOrAfter attributes which MUST be included, the saml:Conditions element MUST include a frc:FederationRestrictionCondition:

frc:FederationRestrictionCondition (MUST)

The FederationRestrictionCondition defines the federation scope in which the cross-organizational SAML assertion can be used. Validation in other scopes must fail.

saml:AttributeStatement

The saml:Assertion MUST contain exactly one saml:AttributeStatement. That saml:AttributeStatement element MUST contain one saml:Subject and a saml:Attribute element.

saml:Subject (MUST)

The subject is the owner of the token and is identified by a saml:SubjectConfirmation/saml:ConfirmationMethod urn:oasis:names:tc:SAML:1.0:cm:holder-of-key as specified in the WSS SAML Token Profile 1.1.

The key is included in a ds:KeyInfo element which contains an xenc:EncryptedKey with a symmetric key encrypted for the receiving partner organization.

saml:Attribute Claims (MUST)

The AttributeName is "Claims" and the AttributeNamespace is "http://schemas.xmlsoap.org/ws/2005/02/trust". The saml:AttributeValue element MUST contain a wst:Claims element.

The wst:Claims element contains the claims that the client possesses in a specific federation scope.

ds:Signature

The Signature MUST contain exactly one ds:Reference referencing the saml:Assertion/@AssertionID attribute. This Reference MUST have exactly two transforms:

The first transform is "Enveloped Signature" (http://www.w3.org/2000/09/xmldsig#enveloped-signature)

The second transform is "Exclusive XML Canonicalization without Comments" (http://www.w3.org/2001/10/xml-exc-c14n#)

To support cross-organizational validation of the signature of the token, the KeyInfo element MAY contain various references to the signing certificate of the issuing STS, including a wsse:SecurityTokenReference/wsse:KeyIdentifier, a wsse:SecurityTokenReference/wsse:Embedded, or an fpi:FederationPartnerIdentifier.

To validate an existing cross-organizational security token at the service side (steps 707, 709) the "Validation Binding" as defined by the WS-Trust specification from February 2005 is used, in which:

wst:TokenType

The WS-Trust token type for validation SAML assertions is defined as follows:

<wst:TokenType>http://docs.oasis-open.org/wss/oasis-wss-saml-token-profile-1.1#SAMLV1.1</wst:TokenType> wsp:AppliesTo

As described above. For token validation, the service MUST at least provide wsa:Address and wsa:Action elements in the wst:RequestSecurityToken/wsp:AppliesTo.

wstx:ValidateTarget

The wstx:ValidateTarget element refers to the target of validation. The wstx:ValidateTarget element MUST contain the cross-organizational saml:Assertion that should be validated.

wst:RequestedSecurityToken

The wst:RequestedSecurityToken MUST contain a saml:Assertion that contains the validation results.

wst:RequestedProofToken

The wst:RequestedProofroken SHOULD contain the public or secret key material with which the service can verify the signature of the received message as well as decrypt the received message. In the current "scoped federations" prototype, the wst:RequestedProofroken contains an xenc:EncryptedKey element. The xenc:EncryptedKey contains the symmetric key associated with the SAML token, now re-encrypted for the service.

wst:Status

The wst:Status element MUST be included in the RSTR as specified by WS-Trust. The predefined URIs, as specified in WS-Trust, are used in the current prototype.

The SAML Assertion Profile for a SAML validation token, as used in the Validation Binding profile above, is based on the SAML 1.1 Assertion specification and the Web Services Security SAML Token Profile 1.1. The validation response is a SAML 1.1 saml:Assertion. The saml:Assertion MUST include saml:Conditions, saml:AttributeStatement, and ds:Signature elements. In addition, a saml:Advice SHOULD be included.

saml:Assertion

The @Issuer attribute SHOULD contain the URI of the validating STS.

saml:Conditions

In addition to the @NotBefore and @NotOnOrAfter attributes which MUST be included, the saml:Conditions element MUST include a frc:FederationRestrictionCondition.

frc:FederationRestrictionCondition (MUST)

The federation scope in (and only in) which this SAML assertion is to be considered.

saml:Advice

The saml:Advice SHOULD contain the original cross-organizational saml:Assertion that has been validated.

saml:AttributeStatement

The saml:AttributeStatement element MUST include a saml:Subject and at least one saml:Attribute element.

saml:Subject (MUST)

The subject is the owner of the original cross-organizational token that is validated, and is identified by a saml:SubjectConfirmation/saml:ConfirmationMethod urn:oasis:names:tc:SAML:1.0:cm:holder-of-key as specified in the WSS SAML Token Profile 1.1.

The key is included in a ds:KeyInfo element which contains a wst:BinarySecret with a cleartext symmetric key (this assumes that the RSTR is properly protected!), or an xenc:EncryptedKey with a symmetric key encrypted for the receiving partner organization.

saml:Attribute FederationPartnerIdentifier (MAY)

The AttributeName is "FederationPartnerIdentifier". This attribute MAY be included to explicitly indicate to the service the partner organization the service request is originating from. If this attribute is present, the saml:AttributeValue element MUST contain an fpi:FederationPartnerIdentifier element.

saml:Attribute Status (MUST)

The AttributeName is "Status" and the AttributeNamespace is "http://schemas.xmlsoap.org/ws/2005/02/trust". This attribute MUST be included to indicate the result of the security token validation. The saml:AttributeValue element MUST contain a wst:Status with one of the predefined wst:Code status codes.

saml:Attribute Claims (SHOULD)

The AttributeName is "Claims" and the AttributeNamespace is "http://schemas.xmlsoap.org/ws/2005/02/trust". This attribute SHOULD be included to pass the validated (and possibly transformed) claims to the service. If this attribute is present, the saml:AttributeValue element MUST contain a wst:Claims element.

A policy enforcement point (PEP) may forward these validated claims to a policy decision point (PDP) to support the policy decision.

saml:Attribute ValidationMessage (MAY)

The AttributeName is "ValidationMessage" and the AttributeNamespace is "urn:string". This attribute MAY be included to pass a human-readable validation result message to the service.

The above profiles and tokens include a number of custom elements and use a number of custom namespace prefixes by way of example only. Alternative forms for the elements and namespace prefixes with equivalent functionality may be used.

The FederationUUID represents a universal and unique identifier for the federation scope. The FederationPartnerIdentifier identifies a partner organization. A partner organization may be identified in various ways as indicated in the Type attribute:

X509SubjectName Type
    X509Data/X509SubjectName (MUST)
        The X.509 DN of the certificate of the issuing STS of the partner.

The FederationRestrictionCondition is a custom SAML condition which intends to indicate the "scope" within which the SAML cross-organizational or validation token MUST be considered. The FederationRestrictionCondition MUST contain a wsp:AppliesTo element. wsp:AppliesTo/wsa:EndpointReference/wsa:Address is the URI of the web service that is invoked. wsp:AppliesTo/wsa:EndpointReference/wsa:Action is the action that is invoked on the web service. wsp:AppliesTo/wsa:EndpointReference/wsa:ReferenceProperties/collab-FederationUUID is the identifier of the federation scope inside which the assertion can be used.

Figure 9:
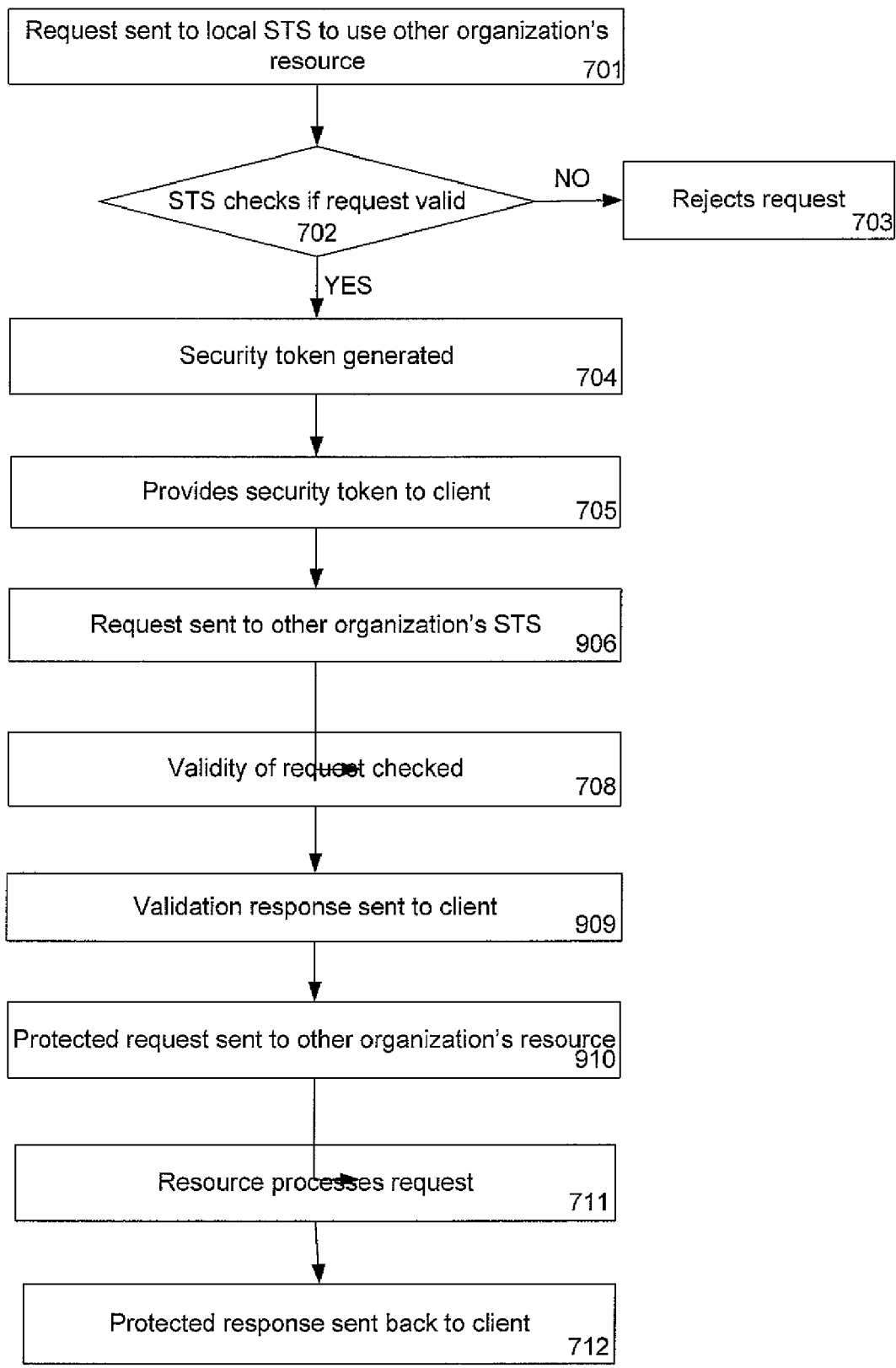
FIG. 9 is a second example flow diagram of a method of using a scoped federation.
Figure 10:
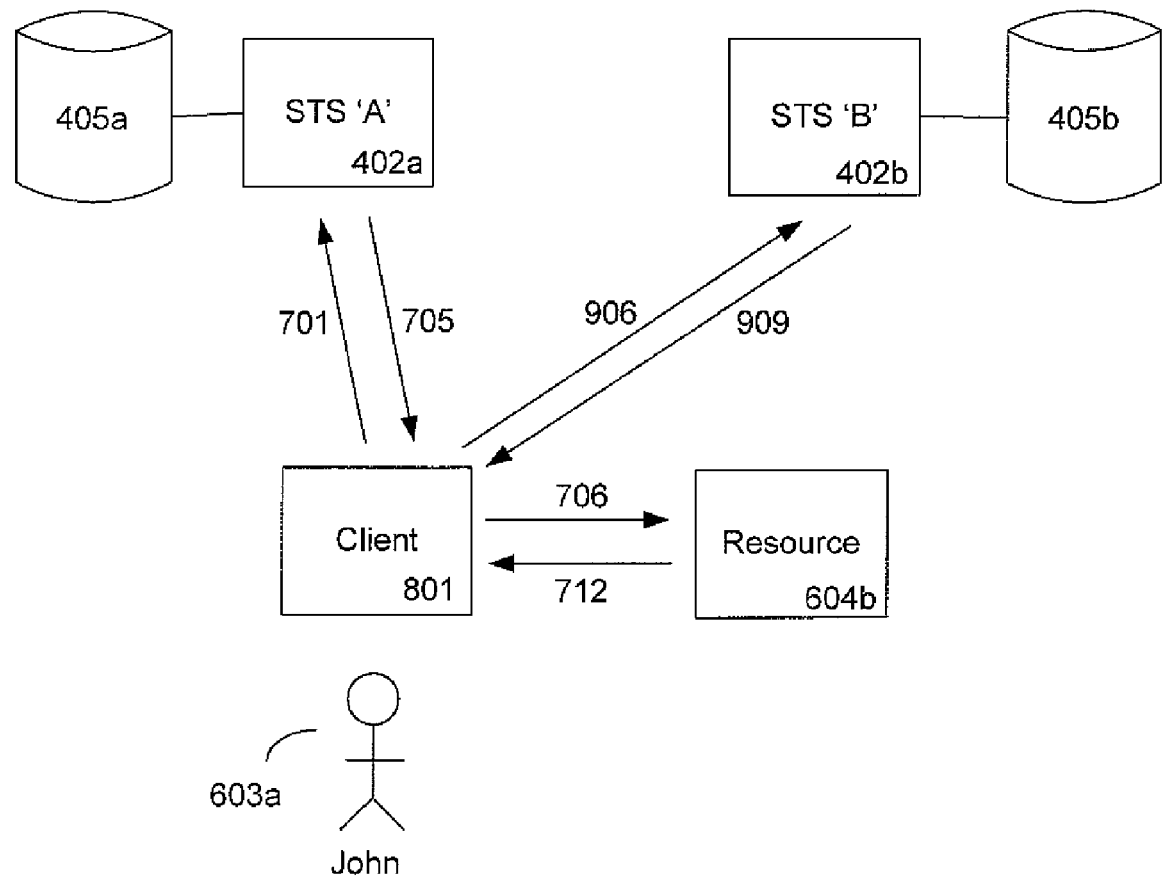
FIG. 10 is a schematic diagram which shows the flow of information in the method of FIG. 9.

Although the above description and first example of a method of using a scoped federation, relate to the interaction model as shown in FIGS. 7 and 8, herein called a 'U' type federation model, the methods described are equally applicable to the setup in FIGS. 9 and 10, herein called a 'V' type federation model. FIG. 9 shows a second example flow diagram of a method of using a scoped federation and FIG. 10 shows the flow of information between entities and individuals in each organization. For purposes of explanation only, FIG. 10 shows a single resource 604b associated with Company B and a single individual 603a (e.g. John) associated with Company A.

An individual 603a, John, at Company A wants to access a resource (such as a service) at Company B as part of a particular scoped federation. As described above, using a client 801, John sends a request to his local STS to use the resource belonging to Company B (step 701). The request message includes the UUID of the particular federation. In response to receiving the request, the STS checks the validity of the request (step 702) by determining if the requestor (John) is part of the federation and the attributes that the requestor has in the context of the particular federation, using the rules stored associated with the particular UUID. If the request is valid, the STS generates a security token (step 704) and provides this to the client (step 705). The security token represents the attributes associated with the requester, John, and the federation context (i.e. the UUID).

The security token is then sent as part of an authenticated and confidentiality protected request (from John via client 801) to the resource side STS (i.e. Company B's STS 402b in the example of FIG. 10) to request a security token to be used for the resource (step 906).

The resource side (e.g. Company B) STS checks the validity of the token (step 708) which involves processing the presented claims in the token based on the rules associated with the UUID. Having completed the check, the STS sends a new security token to the client (step 909) containing the validation response (e.g. granting or denying access to the resource).

If the validation response (received in step 909) indicates that access is granted, the client sends a request to access the resource to the other organization's resource (step 910). This request includes the validation token received from the resource side STS (in step 909). Upon receipt of the request, the resource processes the request (step 711) and sends back an authenticated and confidentiality protected response to John (via the client 801, step 712).

In the above method, as with the method of FIG. 7, all the messages passing between entities contain the UUID which references the particular federation under which requests are being made/granted/denied (e.g. steps 701, 703, 705, 906, 909, 910 and 712).

As described above, the security token, generated in step 704 by the requestor side STS (e.g. Company A's STS 402a) may be encrypted using the security token associated with the resource side STS (e.g. Company B's STS 402b) which was provided as part of the business card (in step 204, as described above). The resource side STS therefore decrypts the token upon receipt (in step 708).

The security token, generated in step 704, may also include a symmetric key which may be used for encryption of some or all of the communications between the two companies (e.g. in steps 910 and 712). As described above the symmetric key is provided to the requestor (client 801) in unencrypted form along with an encrypted security token in step 705. The key is extracted from the encrypted security token by the resource side STS and may be passed to the resource via the new security token, encrypted with a key of the resource (not shown in FIGS. 9 and 10). The key may be used by the client to authenticate and encrypt the request sent to the resource (in step 910) and by the resource to decrypt and verify the authenticity of the request (as part of step 711) and to authenticate and encrypt the response to the client (in step 712).

As mentioned above in relation to the 'U' type model, instead of using a symmetric key, the client and resource may each have their own public/private key pair (either temporarily generated or more long-lived). Messages may be protected using these key pairs, i.e. the client signs a message with its own private key and encrypts the message with the public key of the resource. In this example, as part of the token issuance and validation, the client and resource now have to rely on their STS to validate each others' public key as a valid key/certificate. The STS can check this, since these certificates will have to be issued with the certificate of the organization.

Having established and configured a scoped federation (as shown in FIG. 1), the scope of the federation can be changed by changing the rules associated with the UUID in a similar manner to the method by which the rules were created (as described above with reference to FIGS. 5 and 6). For example, the federation owner within the organization, or another individual (who may require authorization) may generate a new set of rules or amend the existing set of rules and input these new rules or rule changes to the organization's STS (e.g. via a custom web service). This enables the scope of the federation to be easily changed in response to events or changes in circumstances (e.g. employee leaves, new employee starts, employee changes project etc) and because the rules are linked to the particular scoped federation via the UUID, changes in the rules of one federation between organizations does not affect any other federations which exist between the same or different organizations.

As all the messages relating to the scoped federation pass through the STS (or other similar entity), a centralized management entity, such as an IT department within an organization, has visibility and overall control over the federations which are established within an organization. For example, rules may be specified detailing who can set up federations and which organizations can be part of those federations. Furthermore, existing federations can be managed and controlled in a centralized manner, (as described below with reference to FIG. 11). This control of federations may include monitoring of the information flow between organizations.

Figure 11:
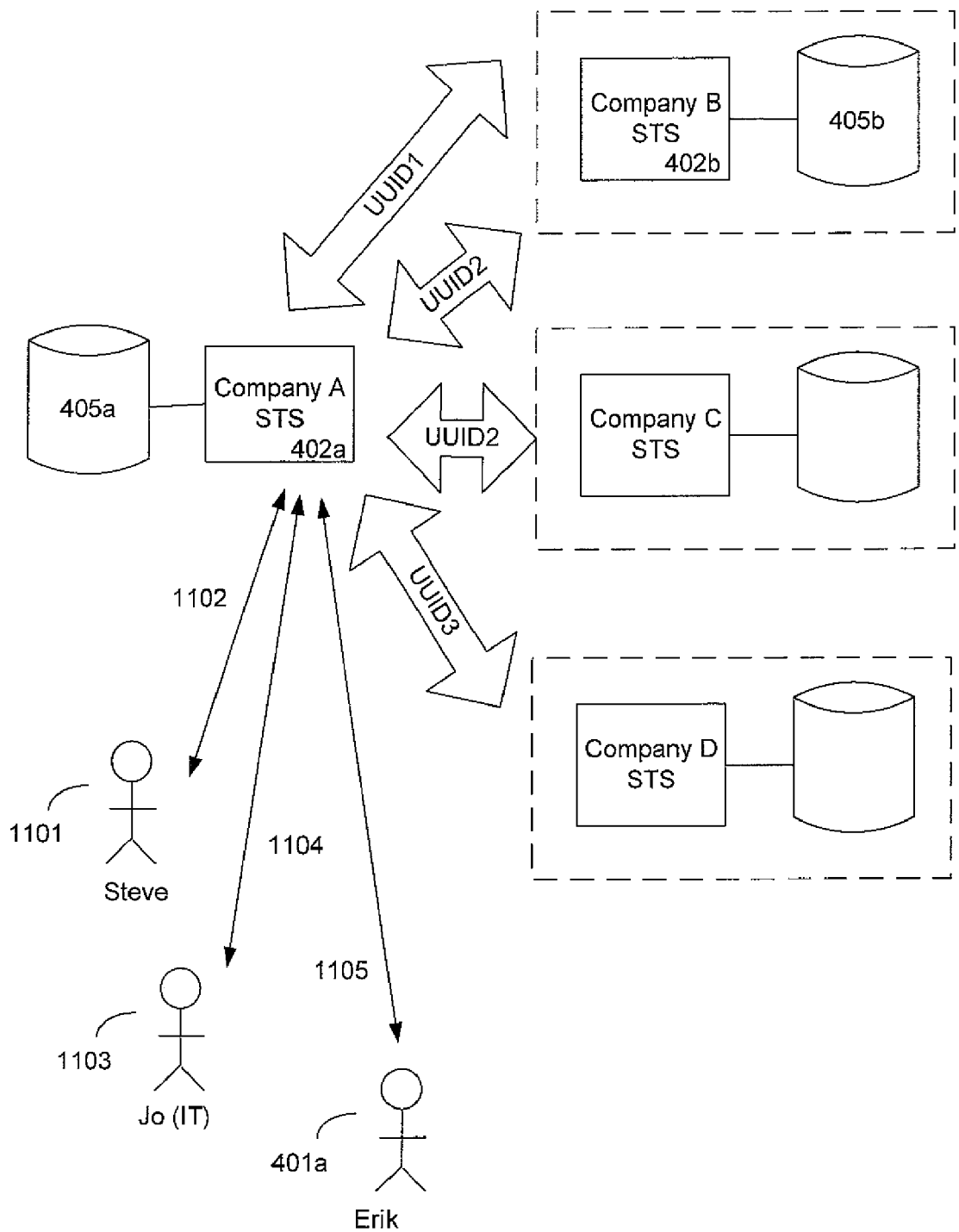
FIG. 11 shows a schematic diagram of a plurality of scoped federations.

FIG. 11 shows a schematic diagram of a plurality of scoped federations in which Company A is involved: a first (UUID 1) with Company B, a second (UUID 2) with Companies B and C and a third (UUID 3) with Company D. As Company A's STS has a database 405*a* containing details of all these federations, this database may be queried by individuals within Company A (e.g. via a suitable client, web service etc) to find out information about existing federations and to manage them if required. In a first example, an individual, Steve 1101, within Company A may be considering working with another organization, such as Company B. In this case, he can send an enquiry 1102 to the STS to identify any existing federations with Company B and then to determine who the owners are of any existing federation (in this example, the owner of federation 1 is Erik 401*a*). He can then contact the owner to obtain whatever information he requires (e.g. information on the experience of working with Company B, contact information for Company B etc). In a second example, an IT manager within Company A (Jo, 1103) may become aware that Company D has a virus in their network. She can query the STS 1104 to determine whether any federations exist with Company D and then put a block on those federations (e.g. implemented as additional rules at the STS, in this example relating to UUID 3) until the problem at Company C is resolved. In a third example, Erik 401*a*, may query the STS 1105 to identify the federations that he owns and to determine whether they are still active/required. Where a federation is identified which is no longer required/active, this may be closed (e.g. deleted from the database 405*a*) by the owner, the IT department or other individual.

Although the above description shows federations being established between companies, this is by way of example only and the federations may be created between any types of member including, but not limited to, companies, organizations, domains, individuals etc. in an example, federations may be established to enable remote working by one or more employees of an organization (e.g. there may be one federation with a particular scope for employees in a first department and a second federation with a different scope for employees in a second department). In another example, a federation may be used in a home environment to enable individuals to federate with their neighbors and share devices in their homes.

Although the present examples are described and illustrated herein as being implemented in system comprising STSs, the system described is provided as an example and not a limitation. As those skilled in the art will appreciate, the present examples are suitable for application in a variety of different types of token management systems.

Figure 12:
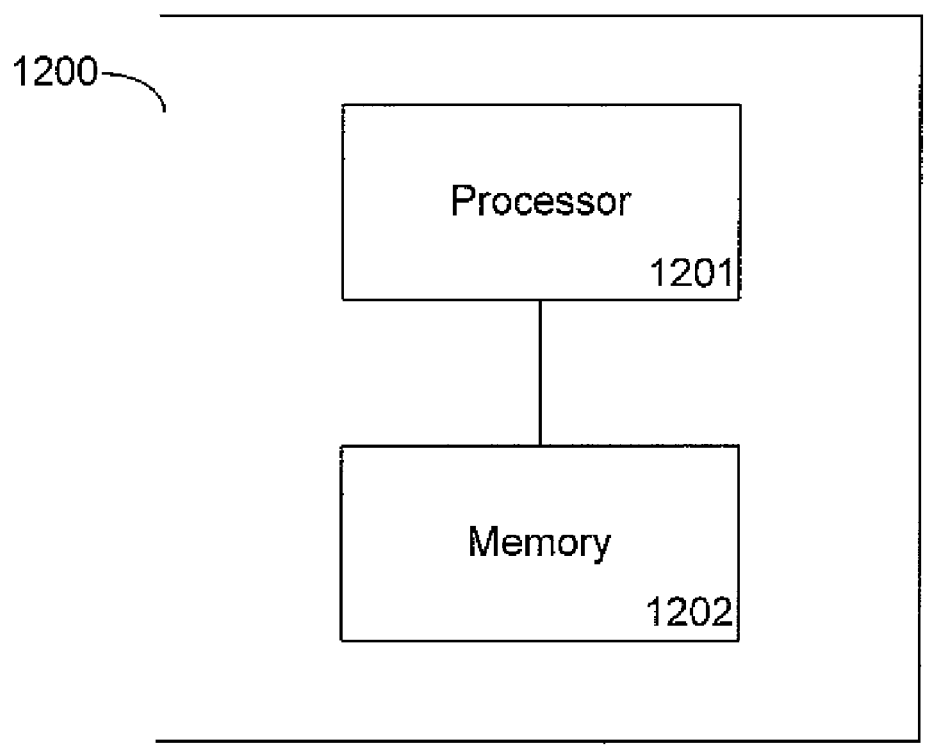
FIG. 12 shows a schematic diagram of an apparatus.

The STS, client application, services and resources described above each comprise code that runs on a computer 1200 (as shown in FIG. 12), comprising a processor 1201 and a memory 1202 arranged to store device executable instructions which when executed cause the processor to perform the required method steps (e.g. as described above).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:

receiving a pre-agreed temporary identifier for a federation, at each of a plurality of security token services associated with each of a plurality of members of the federation;

receiving, at a first security token service, information comprising endpoint information relating to each of the plurality of security token services;

generating a unique identifier for the federation by the first security token service, the generating performed by a processor by taking a hash of data comprising the information and the temporary identifier;

storing, in a memory, the unique identifier associated with the federation;

storing a set of rules scoping said federation associated with said unique identifier;

upon receipt of a message containing said unique identifier, using said set of rules to determine if said message comprises a valid request; and if said message comprises a valid request, enabling sharing of a resource associated with said federation between members of said federation.

2. A method according to claim 1, further comprising:
if said message does not comprise a valid request, preventing sharing of said resource associated with said federation.

3. A method according to claim 1, wherein generating said unique identifier comprises:
forming a block of data comprising said information; and
calculating a hash of said block of data.

4. A method according to claim 1, further comprising, prior to storing said set of rules:
receiving said set of rules,
wherein said set of rules comprises at least one mapping relating to at least one of: an individual, a resource and an access right.

5. A method according to claim 1, wherein said message comprises a claim and using said set of rules to determine if said message comprises a valid request comprises:
accessing said set of rules; and
comparing said claim to said set of rules.

6. A method according to claim 1, wherein enabling sharing of a resource associated with said federation between members of said federation comprises:
generating a security token restricted to said federation; and providing said security token to a sender of said message.

7. A method according to claim 6, wherein said security token restricted to said federation comprises:
at least one claim; and
a key.

8. A method according to claim 1, wherein said message comprises a security token and enabling sharing of a resource associated with said federation between members of said federation comprises:
checking the validity of said security token using said set of rules scoping said federation and associated with said unique identifier; and sending a validation response to a sender of said message.

9. A method according to claim 8, wherein the security token comprises a key, and wherein enabling sharing of a resource associated with said federation between members of said federation further comprises:
extracting said key from said security token; and
sending said key to said resource associated with said federation.

10. One or more computer storage devices with device-executable instructions for performing steps comprising:
receiving a pre-agreed temporary identifier for a federation, at a first security token service associated with a first member of the federation and one or more other security token services associated with one or more other members of the federation;
receiving, at the first security token service, information comprising endpoint information relating to the one or more other security token services;
generating a unique identifier for the federation by the first security token service by taking a hash of data comprising the information, the temporary identifier, and endpoint information relating to the first security token service;
storing the unique identifier associated with the federation;
storing a set of rules scoping said federation associated with said unique identifier;
using said set of rules to determine if a message comprises a valid request; and
if said message comprises a valid request, enabling sharing of a resource associated with said federation between members of said federation.

11. A system comprising:
a first security service associated with a first member of a federation; and
a first store and a second store connected to said first security service, and wherein said first security service is arranged to:
receive a pre-agreed temporary identifier for the federation;
receive information comprising endpoint information relating to another security service associated with another member of the federation;
generate a unique identifier for the federation by a processor by taking a hash of data comprising the information, the temporary identifier, and endpoint information relating to the first security token service;
store the unique identifier associated with said federation in said first store;
store a first set of rules associated with said unique identifier in said second store, said first set of rules scoping said federation and being related to said first member;
upon receipt of a first message containing said unique identifier, use said first set of rules to determine if said first message comprises a valid request; and
if said first message comprises a valid request, enable sharing of a resource associated with said federation between said first and said second member of said federation.

12. The method according to claim 1, wherein the information comprises a security token associated with at least one of the plurality of security token services.

13. A system according to claim 11, wherein said first store and said second store are the same.

14. A system according to claim 11, further comprising:
a second security service associated with said second member of said federation; and a third store and a fourth store connected to said second security service, and wherein said second security service is arranged to store said unique identifier associated with said federation in said third store;
storing a second set of rules associated with said unique identifier in said fourth store, said second set of rules scoping said federation and being related to said second member;
upon receipt of a second message containing said unique identifier, use said second set of rules to determine if said second message comprises a valid request; and
if said second message comprises a valid request, enable sharing of said resource associated with said federation between said first and second members of said federation.

15. A system according to claim 14, further comprising said resource and wherein said resource is associated with said second member and said second message is received from said resource.

16. A system according to claim 15, wherein said first security service is further arranged to:
generate a security token restricted to said federation; and provide said security token to a sender of said first message.

17. A system according to claim 16, wherein said second message comprises said security token and wherein said second security service is further arranged to:
check the validity of said security token using said second set of rules scoping said federation and associated with said unique identifier; and send a validation response to said resource.

18. A system according to claim 17, wherein said second message comprises said security token and said security token comprises a key, and wherein said second security service is further arranged to:
  extract said key from said security token; and
  send said key to said resource; and wherein said resource is arranged, upon receipt of said validation response, to send an authenticated and encrypted message to said sender of said first message using said key.

19. A system according to claim 17, wherein said resource is arranged, upon receipt of said validation response, to:
  process said validation response; and
  if said validation response is positive, to provide access to said sender of said first message.

\* \* \* \* \*